United States Patent Office 3,102,866
Patented Sept. 3, 1963

3,102,866
HEAT-CURABLE COATING COMPOSITIONS
Walter Keigwin Moffett, Birmingham, and Aloysius Norbert Walus, Flint, Mich., assignors to E. I. du Pont de Nemours and Company, Wilmington, Del., a corporation of Delaware
No Drawing. Filed Feb. 13, 1961, Ser. No. 88,623
15 Claims. (Cl. 260—21)

This invention relates to coating compositions consisting essentially of a combination of an alkyd resin and an aminoplast condensate as the essential organic film-forming material and an acid ester curing agent which permits these heat-curable coatings to be readily and advantageously cured at temperatures significantly below the moderate to high baking temperatures ordinarily required, i.e., about 250° F. or higher, to adequately cure these coatings. More particularly, the invention is concerned with a method of curing the above-identified coating compositions which permit these compositions, recognized as baking type enamels curable ordinarily at moderate to high baking temperatures, to be cured at a baking temperature below 250° F. which is practical for repair finishing, such as in automobile refinishing, i.e., temperatures in the range of 150° F. to 230° F.

Combinations of alkyd resins and aminoplast condensates useful as the organic film-forming material of such baking enamels are described extensively in literature and patent art relating to heat-curable coatings. This art also discloses many catalysts which can be used to accelerate the heat-curing of such compositions at ordinary baking temperatures. U.S. Patents 2,074,782; 2,121,690; and 2,292,468 disclose numerous examples of combinations of modified alkyd resins with urea-formaldehyde-alcohol condensates as the aminoplast component. Walus Canadian Patent 570,403 discloses pigmented combinations of oil modified alkyd resins and melamine-formaldehyde-alcohol condensates which are particularly designed for use as automotive enamels. Still other coating compositions formulated with organic film-forming combinations including an oil modified alkyd resin and a melamine-formaldehyde-alcohol condensate which can be cured advantageously in accordance with the teachings of the present invention are disclosed in U.S. Patents 2,218,474; 2,223,327; 2,648,642; and 2,649,423. In these several prior art patents, phosphoric acid, alkyl acid phosphates and ester-forming components which provide alkyl acid phosphates are disclosed as curing agents. Compositions containing drying oil acid modified alkyd resins in combination with the aminoplast condensate may also contain ordinary metal driers to further promote the curing.

A disadvantage of these prior art heat-curable coating compositions recognized as baking enamels is that they require heating or baking under conditions at least equivalent to 20 minutes at 250° F., preferably at least 30 minutes at this temperature to effect adequate cure. In commercial production line coating operations, the baking temperature may range ordinarily up to about 400° F. Baking temperatures in the range of 250° F. and higher are not practical for repair finishing and consequently these prior art baking enamels ordinarily cannot be adequately cured under practical operating conditions for repair finishing where curing temperatures rarely exceed 230° F. Low baking temperatures which are feasible for repair-finishing operations generally range from 150° F. to 230° F. preferably up to about 210° F. A practical curing time generally does not exceed about 150 minutes, a curing period of 10 to 120 minutes at the suitable operating temperature range of 230° F. to 150° F. being most practical.

While some acidic catalysts, e.g., alkyl acid phosphates, are operative in accelerating the cure of these baking-type coating compositions at practical low baking temperatures, characteristics of the resulting cured finishes usually are not equivalent to those of the same coating cured at the ordinary moderate to high baking temperatures of 250° F. and higher in the absence of the acidic catalyst. For example, compositions containing lead chromate pigment cured in the presence of alkyl acid phosphate catalysts darken in color significantly on weathering. Compositions containing hydrous iron oxide pigment in the presence of alkyl acid phosphate catalyst exhibit significant color drift to the light side while the compositions are in the wet state. In addition to the effect on color change, use of the alkyl acid phosphate causes a reduction in gloss retention on weathering.

The primary objective of this invention is to provide improvements in the above-defined baking type liquid coating compositions which enable the coatings deposited therefrom to be cured adequately under baking conditions feasible to repair-finishing operations, i.e., in the temperature range of 150° F. to 230° F. Another important objective is to provide improvements in baking enamels containing a lead chromate pigment which result in inhibition of color change of the cured enamel on exposure to the weather. A further objective is to provide improvements in the curable liquid coating composition which includes hydrous iron oxide pigment which results in inhibition of significant color drift from the recognized standard color for such pigmented compositions.

These and other objectives hereinafter disclosed are accomplished by (a) including an effective small curing proportion of an organic acid oxalate in a baking type liquid coating composition whereof the organic film-forming material consists essentially of a mixture of a fatty oil acid modified alkyd resin and an aminoplast condensate compatible therewith, the film-forming materials being in solution in a volatile liquid organic solvent therefor. The liquid coating compostion may be unpigmented to provide clear finishes which cure at the low baking temperatures ranging from 150° F. to 230° F. or pigmented with ordinary proportions of paint pigments to provide opaque, translucent or transparent coatings appropriately colored. In a more specific aspect of the invention, the liquid coating composition as defined above further includes a lead chromate pigment or a hydrous iron oxide pigment. These pigmented coatings deposited on a heat-resistant substrate and cured by heating for a period of about 8 to 20 minutes at 230° F., about 60 to 150 minutes at 150° F. or for an equivalent period at another temperature in the range of 150° F. to 230° F. provide finishes which are essentially unaffected by the organic acid oxalate curing agent in reference to color changes and retention of gloss.

Useful organic acid oxalates are the partial esters of oxalic acid and an aliphatic monohydric alcohol having the general formula R—OH, the acidic partial ester of oxalic acid being substantially the monoester of oxalic acid having the general formula

The monovalent radical R— consists primarily of carbon and hydrogen atoms as an aliphatic hydrocarbon radical, but it may include additionally one, two or more ether oxygen atoms as in monohydric ether alcohols, e.g., monoethylether of ethylene glycol, monobutylether of ethylene glycol and monoethylether of diethylene glycol. The radical R— can contain from 1 to 20 carbon atoms, the more useful organic acid oxalates having 1 to 12 carbon atoms in the radical R—. Those having 1 to 8 carbon atoms in the radical R— are preferred, butyl acid oxalate being especially preferred.

Useful R— radicals composed of carbon and hydrogen atoms include saturated and ethylenically-unsaturated, straight-chain and branched-chain, and cyclic and acyclic hydrocarbon radicals. Representative R— radicals include: methyl, ethyl, propyl, isopropyl, n-butyl, isobutyl, amyl, isoamyl, cyclopentyl, hexyl, cyclohexyl, 2-ethylbutyl, heptyl, octyl, 2-ethylhexyl, capryl, nonyl, decyl, dodecyl, lauryl, cetyl, stearyl, allyl, crotyl, oleyl, methoxyethyl, ethoxyethyl, butoxyethyl, ethoxyethoxyethyl and butoxyethoxyethyl. In preparing acidic partial esters of oxalic acid for use as catalysts in practicing this invention it is not necessary that the alcohol and oxalic acid components be in equal molar proportions to provide the half ester of oxalic acid. An amount of the monohydric alcohol R—OH in excess of the equivalent proportion necessary to obtain the monoester acid oxalate can be used when presence of the excess alcohol can be tolerated in the coating composition or the alcohol is readily volatilized during drying and heating of the deposited coating. The lower alcohols, i.e., the $C_1$ to $C_8$ monohydric alcohols, can be used and preferably are used in excess molar proportions ranging up to 10 mols per mol of oxalic acid to provide dilute compositions of the partial ester of oxalic acid in solution in the excess alcohol. The esterification is carried out under conditions which provide essentially the monoester acid oxalate. The progress of the esterification is followed by the acid number and it is desirable that the acid number of the resulting catalyst solution corresponds to esterification of at least 45% of the total carboxyl groups of the oxalic acid, preferably about 50%. While partial esterification beyond the monoester acid oxalate, i.e., mixtures of the monoester and the diester, provides operative catalyst compositions which are less active because of reduced acidity, it is desirable that such ester mixtures include a major proportion of the monoester acid oxalate. Preferably not more than 62.5 mol percent of the total carboxyl content of oxalic acid is esterified with the monohydric alcohol, i.e., at least 75 mol percent of the second carboxyl substituent of oxalic acid remains unesterified.

The alcoholic solution of the ester acid oxalate catalyst may further include a compatible organic diluent non-reactive with the carboxyl substituents. Aromatic hydrocarbons, e.g., toluol and xylol, and high solvency petroleum naphthas of the type ordinarily used in coating compositions can be used as diluents in combination with the excess alcohol.

Typical preparation of the acidic partial ester oxalate catalyst solution is as follows.

Butyl acid oxalate solution 1:

| | Parts by weight |
|---|---|
| Oxalic acid, anhydrous (1 mol) | 90 |
| n-Butyl alcohol (4.85 mols) | 360 |
| | 450 |

The mixture is heated to dissolve the acid in the alcohol with the temperature increased from room temperature to about 220° F. in about 30 minutes. Then the solution is refluxed with the water by-product of the esterification being removed azeotropically. During a 40-minute reflux period, about 17 parts of water are removed and the reflux temperature rises to about 230° F. At this stage the acid number is about 139 based on the total weight of the catalyst solution and represents substantially complete esterification of one carboxyl substituent of the oxalic acid. Then the composition is cooled to room temperature.

Butyl acid oxalate solution 2:

| | Parts by weight |
|---|---|
| Oxalic acid, anhydrous (3 mols) | 270 |
| Butyl alcohol (13.5 mols) | 1000 |
| Toluol | 80 |
| | 1350 |

The mixture is heated to about 220° F. in about 10 minutes and then held at about this temperature for about 50 minutes under reflux with the by-product water in an amount of about 51 parts being removed azeotropically. Thereafter the resulting solution is cooled. The acid number of final catalyst solution is about 131 based on the total solution weight.

Other $C_1$ to $C_8$ R—OH aliphatic monohydric alcohols, including monohydric ether alcohols, or mixtures of such alcohols can be substituted either directly or on an equivalent weight basis for the butyl alcohol in the above recipes to provide additional useful partial ester acid oxalate catalyst compositions. With the alcohols having more than eight carbon atoms per molecule, it is preferred to use about one mol of the higher alcohol per mol of oxalic acid with a solvent, diluent or solvent/diluent mixture which provides for azeotropic removal of water from the esterification reaction.

Useful proportions of the partial ester acid oxalate will vary with the acid number of the catalyst composition and with the proportion of acid curing resin in the liquid coating composition. Practical proportions for a monoester acid oxalate catalyst composition having an acid number of about 130 is from about 2 parts to about 15 parts per 100 parts by weight of coating composition which includes about 40 parts of organic film-forming material consisting essentially of 28 parts of alkyd resin and 12 parts of aminoplast condensate, e.g., melamine-formaldehyde-alcohol condensate or urea-formaldehyde-alcohol condensate. If the catalyst solution is prepared at about 65 acid number, practical proportions of the catalyst are about 4 to 30 parts on the indicated basis of 12 parts of aminoplast condensate. When the catalyst is prepared at about 260 acid number, practical proportions of the ester acid oxalate composition is about 1 to 7.5 parts on the indicated basis. When the relative proportions of acid-curing aminoplast condensate in the organic film-forming material is increased, the amount of acidic oxalate catalyst is increased proportionately. Preferred proportions of catalyst are from about 3 to 12 parts of the 130 acid number composition per 12 parts of the aminoplast condensate. Use of proportions greater than 15 parts at 130 acid number on the indicated basis tends to develop undesirable water-sensitivity in the cured coating. Use of proportions less than 2 parts at 130 acid number at the indicated aminoplast level leads to inadequate cure at the low side of the low temperature curing range.

As indicated heretofore by reference to prior art disclosing useful combinations of the alkyd resin and the aminoplast condensate, the proportions of the two essential components of the organic film-forming material is not critical in reference to practicing this invention. In the more practical aspects of practicing the invention, the relative proportion of aminoplast condensate may range from about 5 parts to 100 parts per 100 parts by weight of the fatty oil acid modified alkyd resin.

The composition of the modified alkyd resin is not critical and the modifying fatty oil acids bound to the alkyd resin by an ester linkage can be saturated or unsaturated. Coconut oil acids, castor oil acids and the acids of hydrogenated castor oil are typical of non-drying glyceride oil fatty acids for modifying alkyd resins useful in formulating finishes designed for finishing automobiles, trucks, etc., the coconut oil acids being especially preferred because of the provision of better color retention. Soya bean oil acids, acids of dehydrated castor oil, acids of tall oil, linseed oil fatty acids, cotton seed oil fatty acids, sunflower seed oil acids, safflower seed oil acids and tung oil acids are typical drying oil acids useful for modifying the alkyd resin. Soya bean oil acids are preferred ordinarily of this group.

The proportion of modifying monocarboxylic fatty acid components of the alkyd resin can vary widely in providing internal plasticization of the alkyd resin. Ordinarily the proportion of fatty acid will be that which corresponds to a short-to-medium oil length modification, i.e., about 30% to 50% of the alkyd resin is composed of the fatty acid ester calculated as the fatty acid triester of glycerol, preferably 35% to 45% on the indicated basis.

The linear portion of the alkyd polyester chain is derived from a polyhydric alcohol and a polycarboxylic acid, preferably dicarboxylic, in accordance with known alkyd resin practice. Glycerol, pentaerythritol, hexanetriol, trimethylolpropane, and mixtures of these triols with ethylene glycol or other diols are typical useful polyhydric components and phthalic acid or anhydride, isophthalic acid, azelaic acid and sebacic acid are typical of the dicarboxylic acid component. The polyester-forming reactants are combined in proportions which provide the alkyd resin with a low acid number, usually an acid number no greater than 30 and preferably 15 or less. In achieving such an acid number for the alkyd resin, the polyhydric alcohol is used in an amount in excess of that necessary to satisfy the carboxyl substituents of the polycarboxylic acid and the modifying monocarboxylic acid. Thus the alkyd resin ordinarily contains unreacted hydroxyl substituents. In addition to the fatty oil acids, the monocarboxylic modifier may include other monofunctional acids such as for example, benzoic acid and tertiary butyl benzoic acid.

The alkyd resins are ordinarily solid resins at room temperature and usually are supplied commercially in solution at a resin content in the range of about 40% to 60%, the solvent generally consisting essentially of a volatile aromatic hydrocarbon solvent, such as toluol or xylol, or a high solvency petroleum naphtha.

The composition of the aminoplast condensate is not critical provided the condensate is compatible with the alkyd resin. Suitable urea-formaldehyde-alcohol condensates can be prepared following the teachings of U.S. Patent 2,191,957. Suitable aminotriazine condensates such as melamine-formaldehyde-alcohol condensates and benzoguanamine-formaldehyde-alcohol can be prepared following the teachings of U.S. Patent 2,197,357. A wide variety of suitable condensates of these types are readily available in the resin market usually in the form of solutions containing 50%–60% of the non-volatile condensate in a convenient volatile solvent. Coating resins of these classes are commercially available by several suppliers under such trade names as "Resimene," "Uformite," "Plaskon," "Beetle," "Melmac" and "Beckamine."

Examples of suitable pigments are metal oxides, hydroxides, hydrous oxides, chromates, silicates, sulfides, sulfates and carbonates, carbon blacks, organic dyestuffs and lakes thereof and metal flake pigments like aluminum. Since the catalyzed composition contains free carboxyl groups, acid-sensitive and strongly basic reacting pigments are preferably avoided. The amount of pigment is not critical. It usually is within the range of 1%–200% by weight of the total organic film-forming material present. In formulations for automotive finishing the pigmentation in most instances is no greater than about 75 parts per 100 parts of the organic film-forming material. As indicated hereinbefore, the use of the partial ester acid oxalate catalyst provides special advantages in reference to stabilizing the color when the pigment composition includes lead chromate or hydrous iron oxide.

Suitable solvents, and diluents which can be used in admixture with solvents, include aromatic and aliphatic hydrocarbons, alcohols, ketones, and esters. Mixtures of aromatic hydrocarbons, such as xylene, and aliphatic monohydric alcohols, such as butanol, are preferred. The solvent or solvent mixture, and any diluent which may be used, preferably characterized by a boiling end point no greater than 200° C., must be volatile to the extent that it evaporates readily from a wet coating during the subsequent baking, i.e., drying or curing, step and leaves a dry coating. The amount of solvent, plus diluent if used, is not critical. It usually is within the range of 10%–85% of the total coating composition and in the case of unpigmented clear compositions, the total content of organic film-forming material may be as low as 5% for practical application.

In addition to the foregoing essential components, the coating compositions may contain ancillary components ordinarily included in coating compositions, e.g., plasticizers, other resinous modifiers compatible with the alkyd resin and the aminoplast condensate, metal driers, bodying agents, flatting agents, liquid polysiloxanes, etc.

The coating compositions of this invention can be applied by any conventional method such as spraying, brushing, dipping, flowing or roller coating. Spraying is preferred. The applied coatings are heated by conventional methods to harden and cure them and to develop the properties to an optimum degree. In order to obtain the best results by heat-curing, practical refinish baking schedules are preferred. Practical schedules range from 60 to 150 minutes at about 150° F. to 8 to 20 minutes at about 230° F. The optimum conditions are usually from 15 to 35 minutes at about 180° F. to 12 to 25 minutes at about 210° F.

The following examples are provided to illustrate the principles and practice of this invention, but its scope is not limited to the exact details of these illustrative examples. Unless otherwise indicated, the parts and percentages are given by weight.

PREPARATION OF GREEN COATING COMPOSITION

| | Parts by weight |
|---|---|
| Iron blue pigment dispersion | 282 |
|   Milori blue pigment | 61.0 |
|   Coconut oil alkyd resin | 112.8 |
|   Hydrocarbon solvent | 108.2 |
| Lead chromate pigment dispersion | 276 |
|   C.P. chrome yellow light | 146.5 |
|   Coconut oil alkyd resin | 47.5 |
|   Hydrocarbon solvent | 82.0 |
| Titanium dioxide pigment dispersion | 102 |
|   Titanium dioxide | 61.2 |
|   Coconut oil alkyd resin | 14.2 |
|   Hydrocarbon solvent | 26.6 |
| Carbon black pigment dispersion | 12 |
|   Carbon black pellets | 1.6 |
|   Coconut oil alkyd resin | 3.1 |
|   Hydrocarbon solvent | 7.3 |
| Coconut oil alkyd resin solution, 60% in high solvency naphtha, B.R. 150–190° C., aniline point −28° C. | 572 |
| Melamine-formaldehyde-butanol condensate, 55.5% in butanol | 402 |
| Triethylamine | 4 |
| Polymethylsiloxane solution, 2% in xylol | 2 |
| Toluol | 98 |
| High solvency petroleum naphtha, B.R. 150–190° C. | 92 |
| | 1842 |

The respective pigment dispersions are separately prepared by ball-milling the pigment in the alkyd resin solution until the desired quality of dispersion is obtained. Other ordinary dispersion techniques can be used in place of ball-milling. The coconut oil acids modified alkyd resin is a short oil length glyceryl phthalate alkyd resin having an acid number of about 10 and a viscosity of about Z-2 at 60% concentration in high solvency petroleum naphtha having a boiling range of 150° C. to 190° C. and an aniline point of about −28° C. The alkyd resin solids have a composition corresponding analytically to:

| | |
|---|---|
| Coconut oil glyceride | 37.0 |
| Glyceryl phthalate | 57.4 |
| Glycerol | 5.6 |
| | 100.0 |

The indicated glycerol content is the glycerol equivalent of unesterified hydroxyl substituents in the alkyd resin molecule. The hydrocarbon solvent of the respective dispersions consists essentially of a mixture of toluol and the above-identified high solvency petroleum naphtha. The solvent of the carbon black dispersions includes mineral spirits in addition. The respective ingredients of the recipe are combined and mixed until a uniform product is obtained.

The resulting coating composition has a total nonvolatile content, i.e., solids content, of about 55% by weight consisting essentially of about 36.4 parts of pigment per 100 parts of the organic film-forming material consisting essentially of 70 parts of the alkyd resin and 30 parts of the melamine-formaldehyde-butanol condensate, i.e., about 12% by weight of the aminoplast condensate in the coating composition. The chrome yellow pigment constitutes about 54 parts per 100 parts by weight of total pigment.

This coating composition having no acidic catalyst present is designated as comparative composition A. This composition catalyzed in the proportion of 7.4 parts of butyl acid phosphate catalyst solution, having an acid number of about 138, per 100 parts by weight of composition A is designated as comparative composition B.

| | Example 1 | Example 1a | Example 1b |
|---|---|---|---|
| Green Coating Composition A, 55% Solids | 100 | 100 | 100 |
| Butyl Acid Oxalate Solution 1, Acid Number 139 | 10.7 | 7.4 | 4 |
| Total Parts by Weight | 110.7 | 107.4 | 104 |

The respective compositions are mixed until uniform.

The resulting coating compositions and the two comparative coating compositions A and B are respectively applied by spraying to primed 4" x 12" Bonderite #100 steel panels. The prime coat is a commercially-used, alkyd resin-based black automotive primer applied in the usual manner and baked for about 25 minutes at 375° F. The respective coating compositions are applied with a schedule of one double coat followed by a second double coat with a flash drying period of about two minutes between the coats. The dry coating thicknesses are in the range of 1.6 to 2 mils. Thereafter the deposited coatings are dried at room temperature for about seven minutes and then baked in an oven. The comparative coating A is baked for 30 minutes at 250° F., the usual curing conditions. Comparative coating B and the coatings from Examples 1, 1a, and 1b are heated in an oven at 180° F. for 20 minutes.

The coatings cured with the ester acid oxalate show adequate low temperature cure of coatings in comparison with the coating A which was cured at 250° F., and to the comparative coating B which was cured at 180° F. The Example 1 coatings exhibit excellent gloss, i.e., gloss at 20° and 60° ASTM and excellent intercoat adhesion. Comparative coating B exhibits poor intercoat adhesion and lower gloss level. Coated panels prepared as described are exposed 45° south in Florida and examined after 1 month's, 3 months' and 12 months' exposure. The example 1, 1a, and 1b coatings are durable and weather resistant and show no significant change in color. In contrast the comparative coatings, particularly the coating heat-cured with butyl acid phosphate catalyst, exhibit color change attributed to significant darkening of the lead chromate pigment on exposure. Comparative coating B also exhibits considerable loss in gloss on weathering in comparison with excellent gloss retention by the ester acid oxalate cured coatings.

In another series of formulations, aliquot portions of the above-described uncatalyzed green coating composition are mixed with butyl acid oxalate catalyst solution 2 having an acid number of 131 in the proportions of 100 parts of the coating composition and about 2.8 parts, 6.5 parts and 10 parts respectively of the catalyst solution. These catalyzed compositions are applied to preprimed panels as described above at a dry coating thickness of about 1.7 to 2 mils. Respective sets of coated panels are cured by heating for 20 minutes at the oven temperatures of 180° F., 190° F., and 200° F. The Knoop hardness of the respective cured coatings is determined with a Tukon hardness tester and the results are recorded in the following tabulation.

*Table 1*

| Catalyst concentration | Curing conditions | | |
|---|---|---|---|
| | 180° F. | 190° F. | 200° F. |
| 2.8 parts | 0.8 | 1.1 | 1.3 |
| 6.5 parts | 1.4 | 1.6 | 2.0 |
| 10 parts | 1.6 | 1.9 | 2.3 |

A Knoop hardness of at least 1 is considered to be a practical minimum hardness for automotive refinishing compositions, preferably at least 1.4 to prevent initial water dulling of the cured coating. Thus at the indicated low catalyst concentration of 2.8 parts, it is necessary to heat at a temperature above 200° F., i.e., at 210° F. or higher to achieve the preferred minimum hardness of 1.4. Alternatively, extension of the heating period at these low curing temperatures provides an increase in the degree of cure as measured by Knoop hardness. For example, heating 30 minutes at 190° F. at the catalyst concentration of 2.8 parts provides a Knoop hardness of at least 1.4 for the described coating composition. Oppositely, the curing period reduced below the indicated 20 minutes permits meeting of the preferred minimum Knoop hardness of 1.4 when the higher temperatures and/or higher catalyst concentrations of the ester acid oxalate catalyst are used.

Equivalent curing is achieved when partial ester acid oxalate compositions containing monoethyl acid oxalate, mono-2-ethylhexyl acid oxalate and monoethoxyethyl acid oxalate respectively are substituted on the basis of equal acid number for the butyl acid oxalate in the above-described catalyzed coating compositions.

EXAMPLE 2

| | Parts by weight |
|---|---|
| Chrome yellow pigment | 19.9 |
| Coconut oil acids modified alkyd resin solution 60% resin content | 37.4 |
| Solution of melamine-formaldehyde-butanol condensate, 55.5 resin content | 17.5 |
| Solvents and diluents consisting essentially of xylol and butanol | 17.2 |
| Butyl acid oxalate solution 2 | 8.0 |
| | 100.0 |

EXAMPLE 3

| | Parts by weight |
|---|---|
| Chrome yellow pigment | 19.1 |
| Soy bean oil acids modified alkyd resin solution, 55% resin content | 38.6 |
| Solution of melamine-formaldehyde-butanol condensate, 55.5% resin content | 5.7 |
| Solution urea-formaldehyde-butanol condensate, 60% resin content | 10.6 |
| Solvents and diluents (aromatic hydrocarbons and butanol) | 17.9 |
| Butyl acid oxalate solution 2 | 8.1 |
| | 100.0 |

EXAMPLE 4

| | |
|---|---|
| Chrome yellow pigment | 4.4 |
| Iron blue pigment (milori blue) | 4.4 |
| Coconut oil acids modified alkyd resin solution, 60% resin content | 26.3 |
| Soya bean oil acids modified alkyd resin solution, 55% resin content | 16.0 |
| Melamine-formaldehyde-butanol condensate solution, 55% resin content | 6.4 |
| Urea-formaldehyde-butanol condensate solution, 60% resin content | 11.7 |
| Solvents and diluents (aromatic hydrocarbons and butanol) | 22.0 |
| Butyl acid oxalate solution 2 | 8.8 |
| | 100.0 |

In the Example 2, 3 and 4 compositions, the coconut oil acids modified alkyd resin solution and the melamine-formaldehyde-butanol solution are the same as specified in Example 1. The soya acids modified alkyd resin is a 43% oil length glyceryl phthalate alkyd resin in solution in high solvency petroleum naphtha of the xylol substitute type at 55% resin content. This alkyd resin is characterized by an acid number of about 6 and contains unesterified hydroxyl groups in an amount equivalent to a glycerol content of 5% based on the resin. The urea-formaldehyde-butanol condensate in solution at 60% resin content in butanol is prepared following the teachings of U.S. Patent 2,191,957. The composition of the solvents and diluents is mainly aromatic hydrocarbons and high solvency petroleum naphthas having a boiling end point below 200° C.

These coating compositions are comparatively evaluated versus corresponding compositions in which butyl acid phosphate solution in butanol at acid number 138 is substituted directly for the specified butyl acid oxalate solution 2 in Examples 2, 3 and 4. The same superiority observed in the Example 1 coatings cured with butyl acid oxalate over comparative composition B is noted in these examples. Results of Florida exposure of panels having the cured coatings of Examples 2, 3 and 4 as topcoats show that these coatings containing lead chromate pigment are resistant to color-darkening on weathering and that gloss retention is excellent. In contrast the butyl acid phosphate cured comparative coatings darken noticeably and exhibit deterioration in gloss.

Substitution of chrome orange wholly or in part for the chrome yellow in Examples 2 and 3 provides comparable results.

EXAMPLE 5

| | Parts by weight |
|---|---|
| Aluminum flake pigment | 2.4 |
| Hydrous iron oxide pigment | 0.3 |
| Solution of non-drying alkyd resin, same as specified in Example 1 (60%) | 28.5 |
| Solution of soya acid modified alkyd resin, same as specified in Example 3 (55%) | 17.3 |
| Solution of urea-formaldehyde-butanol condensate, same as specified in Example 3 (60%) | 19.0 |
| Solvents and diluents (high solvency petroleum naphtha and butanol) | 23.2 |
| Butyl acid oxalate solution 1 | 9.3 |
| | 100.0 |

The hydrous iron oxide pigment is prepared following the teachings of U.S. Patent 2,335,760. Midas Gold is a commercially available pigment composition which can be used to provide an equivalent weight of the hydrous iron oxide.

A comparative composition C is prepared the same as the Example 5 composition except butyl acid phosphate solution at acid number 138 is substituted directly for the butyl acid oxalate solution. Results of a comparative evaluation of the Example 5 composition versus comparative composition C shows that the butyl acid phosphate catalyzed composition undergoes significant color change in the wet state. The marked lightening of the hydrous iron oxide brown in the presence of the acid phosphate due to interaction limits the pot-life of this catalyzed coating composition to 48 hours or less. Interaction between the butyl acid oxalate and the hydrous iron oxide pigment is comparatively insignificant, no marked color change occurring during 48 hours of storage in the wet catalyzed state. This butyl acid oxalate catalyzed metallic coating composition exhibits adequate cure under low temperature baking conditions of 20 minutes at 180° F.

Omission of the aluminum pigment from the Example 5 formulation coupled with an increase in the hydrous iron oxide pigment content to 2.7 parts provides a single pigment composition which yields comparable results, i.e., the color stability in the wet state is significantly better than that of the butyl acid phosphate catalyzed liquid coating composition.

EXAMPLE 6

Using a combination of organic film-forming materials which in 100 parts by weight thereof contains 70 parts of 37% oil length coconut oil modified glyceryl phthalate alkyd resin and 30 parts of melamine-formaldehyde-butanol condensate, an aluminum coating composition is formulated having 3 parts of aluminum pigment per 100 parts of the organic film-forming material. A second aluminum coating composition is formulated at double the pigment content, i.e., 6 parts of aluminum per 100 parts of the film-forming material. The volatile content of the coatings consists mainly of a mixture of high solvency petroleum naphtha and butanol in proportions comparable to those shown in Example 1.

EXAMPLE 7

A black coating composition is formulated with the same organic film-forming combination as specified in Example 6 using carbon pigment in the proportion of 7 parts per 100 parts of the film-forming material.

EXAMPLE 8

A white coating composition is formulated with the same organic film-forming combination as specified in Example 6 using titanium dioxide pigment in the proportion of 55 parts per 100 parts of the organic film-forming material.

Portions of the respective single pigment compositions of Examples 6, 7 and 8 are catalyzed with butyl acid oxalate Solution 2 having an acid number of 131 in the proportion of about 6 parts per 12 parts of the aminoplast condensate in one series and about 9 parts of the catalyst composition on the indicated basis in a second series. Comparative compositions are prepared using butyl acid phosphate composition having an acid number of 138 with other portions of these compositions in the proportion of 6 parts of the catalyst per 12 parts of the aminoplast condensate.

The resulting catalyzed compositions are evaluated comparatively as described for Example 1 versus the coatings cured without the aid of an acid catalyst. The uncatalyzed compositions are cured by heating for 30 minutes at 250° F. The butyl acid oxalate catalyzed compositions and the butyl acid phosphate catalyzed compositions are cured by heating for 20 minutes at 180° F. Results show that curing of the acid ester catalyzed compositions at the low temperature provides a degree cure adequate in comparison with the cure obtained at 250° F. with the composition having no acid catalyst present. Results of exposing these cured coatings in Florida for a period up to twelve months show advantageous retention of gloss by the butyl acid oxalate catalyzed compositions in comparison with the butyl acid phosphate compositions. The aluminum coatings cured in the presence of butyl acid phosphate exhibit significant darkening during the 12 months of weathering while the aluminum coatings cured in the presence of the butyl acid oxalate remain practically unchanged in color. The weather resistance is recognized as excellent.

We claim:

1. A heat-curable coating composition consisting essentially of a fatty glyceride oil acid modified polyhydric alcohol-polycarboxylic acid polyester resin and a soluble monohydric alcohol modified aminoplast condensate compatible therewith as the essential organic film-forming materials in solution in a volatile liquid organic solvent therefor and, as a catalyst for accelerating the cure of said film-forming materials, a partial ester acid oxalate composition consisting essentially of at least one monoester of oxalic acid having the general formula

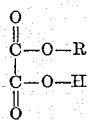

where the monovalent radical R— is the organic radical of a $C_1$ to $C_{20}$ aliphatic monohydric alcohol having the formula R—OH which is composed solely of carbon, hydrogen and oxygen atoms, any oxygen in excess of one oxygen atom being an ether oxygen moiety.

2. The coating composition of claim 1 wherein the radical R— of said ester acid oxalate is a $C_1$ to $C_8$ saturated aliphatic radical.

3. The coating composition of claim 2 wherein the radical R— of said ester acid oxalate is a $C_1$ to $C_8$ saturated aliphatic hydrocarbon radical.

4. The coating composition of claim 1 wherein said monoester of oxalic acid is butyl acid oxalate.

5. A coating composition of claim 1 which further includes at least one paint pigment.

6. A coating composition of claim 5 wherein said pigment includes lead chromate pigment.

7. A coating composition of claim 5 wherein said pigment includes a hydrous iron oxide pigment.

8. A coating composition of claim 1 wherein said polyhydric alcohol-polycarboxylic acid polyester resin is a non-drying glyceride oil fatty acid modified linear polyester condensate of a polyhydric alcohol and a dicarboxylic acid.

9. A coating composition of claim 1 wherein said polyhydric alcohol-polycarboxylic acid polyester resin is a drying glyceride oil fatty acid modified linear polyester condensate of a polyhydric alcohol and a dicarboxylic acid.

10. A coating composition of claim 1 wherein said monohydric alcohol modified aminoplast condensate is at least one member of the group consisting of melamine-formaldehyde-$C_1$ to $C_8$ monohydric alcohol condensates and urea-formaldehyde-$C_1$ to $C_8$ monohydric alcohol condensates.

11. A heat-curable coating composition consisting essentially of a mixture of 30% to 50% oil length coconut oil modified glyceryl phthalate polyester resin and a soluble monohydric alcohol modified aminoplast condensate consisting essentially of at least one member of the group consisting of melamine-formaldehyde-$C_1$ to $C_4$ alkanol condensates and urea-formaldehyde-$C_1$ to $C_4$ alkanol condensates, said aminoplast condensate being in the proportion of 5 to 100 parts per 100 parts by weight of said polyester resin, as the essentially organic film-forming material in solution in a volatile liquid organic solvent therefor, at least one insoluble paint pigment including a lead chromate pigment, and butyl acid oxalate as a catalyst for accelerating and curing of coating deposited from said liquid composition.

12. A method for low temperature curing of heat-curable coating compositions which ordinarily cure at a temperature in the range of 250° F. to 400° F., said coating composition consisting essentially of a combination of a fatty glyceride oil acid modified polyhydric alcohol-polycarboxylic acid polyester resin and a soluble monohydric alcohol modified aminoplast condensate compatible therewith as essential organic film-forming materials in solution in a volatile liquid organic solvent therefor and at least one paint pigment, said method comprising the steps of (a) including in said coating composition an effective curing proportion of a partial ester acid oxalate composition consisting essentially of at least one monoester of oxalic acid having the general formula

where the monovalent radical R— is the organic radical of a $C_1$ to $C_{20}$ aliphatic monohydric alcohol having the formula R—OH which is composed solely of carbon, hydrogen and oxygen atoms, any oxygen in excess of one oxygen atom being an ether oxygen moiety, (b) depositing at least one coat of the resulting catalyzed heat-curable coating composition on a heat-resistant substrate, and (c) heating the deposited coating at a curing temperature in the range of from 150° F. to about 230° F. for an effective period ranging up to about 150 minutes sufficient to adequately cure the coating.

13. The method of claim 12 wherein said monoester of oxalic acid is butyl acid oxalate and said heating is carried out under conditions ranging from 15 to 35 minutes at about 180° F. to 12 to 25 minutes at about 210° F.

14. The method of claim 12 wherein said coating composition contains, as essential organic film-forming materials, a coconut oil acid modified glyceryl phthalate polyester resin and said aminoplast condensate selected from the group consisting of urea-formaldehyde-$C_1$ to $C_8$ monohydric alcohol condensates, melamine-formaldehyde-$C_1$ to $C_8$ monohydric alcohol condensates and mixtures thereof, and said paint pigment includes lead chromate, said heating being carried out under conditions ranging from 60 to 150 minutes at 150° F. to 8 to 20 minutes at about 230° F., the effective proportion of said catalyst composition equivalently being from 2 to 15 parts of catalyst composition having an acid number of about 130 per 12 parts of aminoplast condensate.

15. A coating composition of claim 8 having coconut oil fatty acids as the modifying non-drying glyceride oil fatty acids of said polyester resin.

References Cited in the file of this patent

UNITED STATES PATENTS

| 2,074,782 | Edgar | Mar. 23, 1937 |
| 2,218,474 | Moore | Oct. 15, 1940 |
| 2,648,642 | Spencer | Aug. 11, 1953 |

FOREIGN PATENTS

| 570,403 | Canada | Feb. 10, 1959 |